US011873162B2

(12) United States Patent
Salomon et al.

(10) Patent No.: US 11,873,162 B2
(45) Date of Patent: *Jan. 16, 2024

(54) SYSTEM FOR OPERATING A REFUSE CONTAINER AND METHOD FOR OPERATING A REFUSE CONTAINER

(71) Applicant: emz-Hanauer GmbH & Co. KGaA, Nabburg (DE)

(72) Inventors: Alexander Salomon, Pfreimd (DE); Raoul Janssen, Schwandorf (DE); Gabi Hahn, Schwandorf (DE); Johannes Lindner, Pfreimd (DE); Michael Schmid, Riedlingen (DE); Andreas Söldner, Rieden (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 502 days.

This patent is subject to a terminal disclaimer.

(21) Appl. No.: 16/718,701

(22) Filed: Dec. 18, 2019

(65) Prior Publication Data

US 2020/0204995 A1 Jun. 25, 2020

(30) Foreign Application Priority Data

Dec. 21, 2018 (EP) ..................................... 18215141

(51) Int. Cl.
*B65F 1/14* (2006.01)
*H04W 4/80* (2018.01)
(Continued)

(52) U.S. Cl.
CPC ........ *B65F 1/1484* (2013.01); *G06K 19/0727* (2013.01); *G06Q 10/30* (2013.01);
(Continued)

(58) Field of Classification Search
None
See application file for complete search history.

(56) References Cited

U.S. PATENT DOCUMENTS 352,887 A 11/1886 Potter
5,565,846 A * 10/1996 Geiszler ................ B65F 1/1484
177/139

(Continued)

FOREIGN PATENT DOCUMENTS

CN 106892231 6/2017
DE 102008005119 9/2008
(Continued)

OTHER PUBLICATIONS

English translation EP2974984A1 (Year: 2022).*
(Continued)

*Primary Examiner* — Gennadiy Tsvey
(74) *Attorney, Agent, or Firm* — SHERIDAN ROSS P.C.

(57) ABSTRACT

The invention relates to a system for operating a refuse container, comprising a refuse container which has an electronic control device and a first communication interface for sending and receiving data, wherein a first data transfer to at least one further communication interface can be initiated via the first communication interface, said further communication interface being provided in at least one further communication device which is not associated with the refuse container, wherein a further data transfer between at least one internal device can be initiated via the first communication interface, wherein the first and the further data transfer are based on a wireless technology.

15 Claims, 3 Drawing Sheets

(51) Int. Cl.
  G06K 19/07 (2006.01)
  G06Q 10/30 (2023.01)
  H04W 12/06 (2021.01)
  H04W 84/12 (2009.01)
  G07C 9/00 (2020.01)

(52) U.S. Cl.
  CPC ..... G07C 9/00571 (2013.01); G07C 9/00896 (2013.01); H04W 4/80 (2018.02); H04W 12/06 (2013.01); H04W 84/12 (2013.01); B65F 2210/128 (2013.01)

(56) References Cited

U.S. PATENT DOCUMENTS

| | | |
|---|---|---|
| 6,448,898 B1 * | 9/2002 | Kasik ..................... B65F 1/14 232/35 |
| 7,311,207 B2 | 12/2007 | Mallett et al. |
| 7,511,611 B2 | 3/2009 | Sabino et al. |
| 8,606,596 B1 | 12/2013 | Bochenko et al. |
| 8,994,546 B2 | 3/2015 | Breed et al. |
| 9,378,489 B2 | 6/2016 | Akerblom et al. |
| 9,847,020 B2 | 12/2017 | Davis |
| 9,902,539 B2 | 2/2018 | Poss et al. |
| 10,106,319 B2 | 10/2018 | Adam et al. |
| 10,271,696 B2 | 4/2019 | Thom |
| 10,955,284 B2 | 3/2021 | Balachandran et al. |
| 10,977,622 B2 | 4/2021 | Borowski et al. |
| 11,074,556 B2 | 7/2021 | Kekalainen et al. |
| 11,315,085 B2 | 4/2022 | Candel et al. |
| 2002/0108507 A1 | 8/2002 | May et al. |
| 2005/0228682 A1 | 10/2005 | Firestone, III |
| 2009/0146838 A1 | 6/2009 | Katz |
| 2010/0312601 A1 * | 12/2010 | Lin ..................... G06Q 10/08 705/308 |
| 2011/0035604 A1 | 2/2011 | Habraken |
| 2011/0062230 A1 | 3/2011 | Ward, II |
| 2011/0116899 A1 | 5/2011 | Dickens |
| 2012/0217158 A1 | 8/2012 | Takahashi et al. |
| 2013/0087562 A1 * | 4/2013 | Thukral ............... B65F 1/1615 220/210 |
| 2014/0208813 A1 * | 7/2014 | Reeb ................... B65F 1/1646 70/277 |
| 2014/0239059 A1 * | 8/2014 | Flood ............... G06K 19/07758 235/375 |
| 2014/0278630 A1 | 9/2014 | Gates et al. |
| 2014/0340197 A1 * | 11/2014 | Flood ................. G06V 10/10 340/5.81 |
| 2014/0347166 A1 | 11/2014 | Akerblom et al. |
| 2015/0102941 A1 | 4/2015 | Keech et al. |
| 2015/0298903 A1 | 10/2015 | Luxford |
| 2015/0307273 A1 | 10/2015 | Lyman |
| 2015/0348252 A1 | 12/2015 | Mask |
| 2017/0052052 A1 | 2/2017 | Gwon et al. |
| 2017/0211969 A1 | 7/2017 | Waite et al. |
| 2018/0028770 A1 | 2/2018 | Parrish |
| 2021/0188541 A1 | 6/2021 | Kurani et al. |

FOREIGN PATENT DOCUMENTS

| | | | |
|---|---|---|---|
| EP | 698567 A1 * | 2/1996 | ............ B65F 1/1615 |
| EP | 1818281 | 8/2007 | |
| EP | 2377779 | 10/2011 | |
| EP | 2974984 | 1/2016 | |
| EP | 3125201 | 2/2017 | |
| EP | 3321215 | 5/2018 | |
| FR | 2930665 | 10/2009 | |
| JP | 2005008339 A * | 1/2005 | ............ B65F 1/1484 |
| JP | 2006155645 A * | 6/2006 | |
| KR | 10-2010-0092854 | 8/2010 | |
| WO | WO 2017/216755 | 12/2017 | |

OTHER PUBLICATIONS

English translation EP2377779A1 (Year: 2022).*
English translation EP3321215A1 (Year: 2022).*
Official Action for Singapore Patent Application No. 10201911425P, dated Aug. 21, 2020, 4 pages.
Official Action for Singapore Patent Application No. 10201911425P, dated Jul. 18, 2021, 6 pages.
Extended Search Report for European Patent Application No. 18215141.5, dated Jul. 5, 2019, 4 pages.
Extended Search Report for European Patent Application No. 18215015.1, dated Jul. 1, 2019, 3 pages.
Official Action for Singapore Patent Application No. 10201911423T, dated Aug. 21, 2020, 3 pages.
Official Action for Singapore Patent Application No. 10201911423T, dated Jul. 12, 2021, 7 pages.
Article 94(3) Communication for Europe Patent Application No. 18215015.1, dated Jul. 1, 2022, 7 pages.
Article 94(3) Communication for Europe Patent Application No. 18215141.5, dated Jul. 1, 2022, 8 pages.
Official Action for U.S. Appl. No. 16/718,623 dated Jul. 20, 2022, 8 pages.
Notice of Allowance for U.S. Appl. No. 16/718,623, dated Nov. 21, 2022, 10 pages.
Crisnapat et al., "STTS: IoT-based Smart Trash Tracking System for Dumpsters Monitoring using Web Technology," 1st International Conference on Advance and Scientific Innovation (ICASI), Journal of Physics Conference Series, vol. 1175, No. 012089, 2019, 8 pages.
Draz et al., "A Real-Time Smart Dumpsters Monitoring and Garbage Collection System," IEEE Fifth International Conference on Aerospace Science & Engineering (ICASE), 2017, 8 pages.
Joshi et al., "SmartGarbage Monitoring System," Proceedings of the 7th International Conference on Computing Communication and Networking Technologies, Jul. 2016, 5 pages.
Medehal et al., "Automated smart garbage monitoring system with optimal route generation for collection," IEEE International Smart Cities Conference (ISC2), 2020, 7 pages.
Official Action for U.S. Appl. No. 16/718,623 dated Aug. 10, 2023, 24 pages.

* cited by examiner

SYSTEM FOR OPERATING A REFUSE CONTAINER AND METHOD FOR OPERATING A REFUSE CONTAINER

CROSS-REFERENCE TO RELATED APPLICATION

This application claims the benefit of European Patent Application No. 18215141.5 filed Dec. 21, 2018, the entire contents of which are incorporated herein by reference in its entirety.

FIELD

The present invention relates to a system for operating a refuse container, comprising a refuse container which has an electronic control device and a first communication interface for sending and receiving data. The invention further relates to a method for operating a refuse container.

BACKGROUND

For the disposal of household waste, large-scale refuse containers are often provided which are used by several households. Such refuse containers may belong to a housing community or a municipality, for example. As a rule, only registered users should have access to such refuse containers, wherein access can be blocked, for example if the waste disposal costs are not paid. Such access can be realised by means of various electronic systems. Accordingly, a user of the refuse container must be provided with a specific means of identification by means of which he can gain access to the refuse container. Such means of identification may be a communication device, for example a smartphone. Before opening the access to the refuse container, a check must be carried out based on the identification data to see if the user has access rights. For this purpose, what is needed is a data connection to a server which contains the corresponding identification and authorisation data.

Such refuse containers must therefore have the ability to communicate with a variety of other equipment. For example, there must be communication with a server queried by the refuse container. Furthermore, it is necessary to communicate with the communication device for purposes of identification. A problem with systems of this type is that such communication is energy intensive.

In particular, in refuse containers that are not assigned to a housing community, but are placed in a public space, the energy supply is often problematic because the energy supply must be protected from access by unauthorised persons. In addition, utility companies require metering equipment to record the energy use for purposes of billing. The cost of these meters often exceeds the energy costs many times over, such that alternative solutions are desired here. Previous proposed solutions include a decentralised power supply via batteries, solar cells or generators (conversion of wind energy or mechanical energy fed in by the user), for example. However, these solutions are also costly and enlarge the refuse container without increasing the capacity thereof, which is also undesirable in public spaces.

Further costs arise due to the frequent use of mobile connections for transferring data between a server and a refuse container. For such a data transfer, the refuse container must be equipped with corresponding data transmission technology, which consumes power. Such refuse containers are therefore relatively expensive and require power to communicate over the mobile network, the communication also generating costs and administrative burdens due to the fees charged by the mobile network operator.

In addition, such refuse containers have further internal devices in addition to the control device, for example a locking device or various sensors. Accordingly, internal communication must take place inside the refuse container. Usually this involves complex wiring of the refuse container, which affects the cost of the refuse container.

SUMMARY

The object of the present invention is therefore to provide a system which eliminates or at least minimises the above-mentioned disadvantages.

This object is achieved by the independent claims, in particular the system according to claim 1 and the method according to claim 13.

An essential aspect of the invention is a system for operating a refuse container, comprising a refuse container which has an electronic control device and a first communication interface for sending and receiving data, wherein a first data transfer to a further communication interface provided in at least one further communication device which is not associated with the refuse container can be initiated via the first communication interface, wherein a further data transfer between at least one internal device can be initiated via the first communication interface, wherein the first and the further data transfer are based on a wireless technology.

Such a system has the advantage that both the communication with an external communication device, for example for user identification, as well as communication with internal devices can take place via a single communication interface. Accordingly, a considerable amount of effort in terms of hardware and software can be saved. As a result, a simple and efficient integration of different components of the refuse container can be ensured. In addition, the communication interface for the respective data transfer uses a wireless technology, avoiding costly cabling of the refuse container.

Advantageously, the first and the further data transfer can be a unidirectional or else a bidirectional data transfer. A unidirectional data transfer here means that data is transferred only in one direction, i.e. from the first communication interface via the further communication interface to the second communication interface or from the second communication interface via the further communication interface to the first communication interface. A bidirectional data transfer is understood here to be a data exchange which takes place in both directions. The possibility of a bidirectional data transfer allows data transfer from the internal device to the first communication interface and also to other internal devices, such as the control device, or even to external devices, such as a server. Conversely, data can also be transferred from these devices to the internal device. Such data can be software or firmware updates, for example.

A refuse container can be understood to mean a so-called residual refuse container or a recyclables collection container, such as a paper, bottle or plastics collection container.

The terms "first data transfer", "further data transfer" and "following data transfers" are not to be understood as being consecutive in time. Rather, these terms should be understood to mean a certain type of data transfer.

Advantageously, there is a communication connection between the first communication interface and the control device and between the control device and a memory device which the refuse container comprises. It is advantageous for such a communication connection to be wired.

According to a preferred embodiment, the refuse container comprises at least one sensor device which constitutes an internal device. Preferably, the further data transfer is a sixth data transfer which can take place between the at least one sensor device and the first communication interface via a fifth communication channel. Preferably, the sixth data transfer may be unidirectional or bidirectional. A bidirectional data transfer allows the transfer of software or firmware updates to the at least one sensor device, for example.

The at least one sensor device could advantageously have a sensor for monitoring the temperature inside the refuse container. By such monitoring the start of a fire in the container can be detected and reported quickly.

Furthermore, the sensor device could have a level sensor, which ensures timely emptying. The level sensor can perform sonographic or optical level detection.

It would also be possible for the sensor device to have a motion sensor for movements in the interior of the refuse container. Thus, trapped animals could be detected, for example.

A sensor for detecting movements of the refuse container itself or a sensor for detecting force effects on the refuse container could also be provided. Such sensors could detect and report vandalism.

Furthermore, a weight sensor could be provided, which detects the weight of the disposed waste. Such a sensor could be used to calculate the cost to the user based on the weight of the disposed waste. Thus, a "fair" cost accounting for the user would be possible.

It would also be conceivable to provide sensors which detect the disposal of certain materials, such as metals. Thus, unauthorised disposal of such materials can be detected in such a residual refuse container.

Furthermore, the sensor device may be an odour sensor, by means of which an excessive odour burden on the environment around the refuse container can be prevented by carrying out early emptying.

Finally, the sensor device may also be a noise sensor.

According to a further preferred embodiment, the at least one sensor device is a location-determining device, by means of which the location of the refuse container can be determined.

Such a location-determining device can facilitate recovery of the refuse container after a theft or vandalism, for example. Such a location-determining device could be a GPS device, for example.

For determining the location, BSSID (basic service set identification) data can advantageously also be queried from WLAN access points located in the vicinity of the refuse container using a suitable location-determining device. Such BSSID data can then be transferred to the server. These data can then be evaluated by the server in such a way that the location of the refuse container can be determined.

According to a further preferred embodiment, the further data transfer is a seventh data transfer. Advantageously, control data can be transferred to the at least one internal device of the refuse container or to at least one external device by means of the seventh data transfer. Advantageously, the seventh data transfer takes place via a sixth communication channel and can be unidirectional or bidirectional. Preferably, the at least one internal device may be an actuator, a locking device, a display device, an output device or a fire extinguisher.

The seventh data transfer via the sixth communication channel is preferably based on a wireless technology. However, it may also be necessary that an alternative data transfer takes place between the first communication interface and a further internal device which is transferred to a wired communication channel.

According to a further preferred embodiment, the control data can be generated on the basis of a triggering event. Preferably, the control data can be generated at least in part by the control device and/or at least in part by a sensor device. Such a triggering event can be structured in various ways. For example, it may be based on specific sensor data. Accordingly, by the detection of a specific circumstance, such as temperature, heat, fill level, specific sensor data would be generated by a sensor, the specific data then being advantageously evaluated fully or in part by the controller. On the basis of the evaluation, corresponding control data can then be generated which are transferred to the specific device.

However, it would also be conceivable that the sensor device already has an evaluation device which evaluates the sensor data at least in part and generates the control data at least in part. Said control data are then transferred to the specific device via the first communication interface and optionally via the control device and the first communication device.

However, the evaluation of the control data can preferably also be carried out by a server which is at a distance from the refuse container and has initially received the sensor data via the first communication interface. The control data are then transferred via the first communication interface by means of the seventh data transfer to the at least one internal or the at least one external device.

For example, the level sensor could measure a certain fill level, which would allow no further disposal. The sensor data corresponding to the fill level would then be evaluated by either the sensor device, the control device, the server or another evaluation device. The correspondingly generated control data are then transferred to the internal device, which is in the form of a locking device, so that it locks the refuse container, whereby further disposal is prevented. At the same time, a further internal or external device in the form of a display or output device could be activated, the device indicating that the refuse container is currently unusable.

Similarly, a fire could be detected in or near the refuse container by means of an odour or temperature sensor. The control data generated as a result would then be transferred to an internal or external fire extinguisher, which would be activated.

However, the triggering event may advantageously also be a data transfer, a mere recognition of a specific communication device, a lapse of a predetermined time interval or the like.

According to a further preferred embodiment, the further communication device comprises a first communication device, which comprises the further communication interface in the form of a third communication interface. Preferably, an emptying or service vehicle is equipped with the first communication device. Advantageously, a data transfer by means of a wireless technology between the first communication interface and the third communication interface represents a triggering event. The control device preferably generates control data which are transferred to the internal device, in the form of a locking device, on the basis of the triggering event, whereupon the locking device unlocks. Thus, the system can advantageously provide automatic unlocking of the refuse container during an emptying operation. Up to this point, such unlocking is instructed based on detection of a lifting operation. In this case, the emptying or service vehicle, i.e. the first communication device, can have already been detected by a data transfer. Accordingly, it is advantageous if authorisation takes place after establishing a communication connection between the first communication interface and the second communication interface. In this case, the control device detects the presence of an emptying vehicle and forwards corresponding control data via the first communication interface to the corresponding locking device. Such a detection can take place for example by a "handshake" in an NFC connection or a "pairing" in a Bluetooth® connection.

After the emptying process, the departure of the emptying vehicle can be detected, whereupon the control device outputs corresponding control data via the first communication interface to the corresponding locking device for locking.

An example of a preferred control of external devices by means of wireless technology may be a control of a barrier that blocks the approach to the refuse container. After detecting an emptying or service vehicle by means of a wireless data transfer between the first communication interface and the third communication interface, corresponding control data can be transferred to such a barrier, whereby the passage of the emptying or service vehicle is permitted.

According to a further preferred embodiment, the system has a server which is at a distance from the refuse container and which comprises a second communication interface. Advantageously, the first communication interface has no device for direct data transfer to the second communication interface. Preferably, an indirect first data transfer can be initiated between the first communication interface and the second communication interface and/or between the second communication interface and the first communication interface via the at least one further communication interface. It is preferable for the control device to store the usage data in a memory device associated with the refuse container after the container is used. Advantageously, the stored usage data are transferable to the server via the first data transfer. Such a system has the advantage that the refuse container does not have to include a powerful communication interface for making direct communication (e.g. by way of a mobile network) with the server. Rather, it is provided that for the purpose of data exchange between the refuse container and the server, communication channels are used which are provided by a further communication device not associated with the refuse container. The energy requirement to transfer the data by way of a preferably, at least partially, wireless network to the server is therefore borne by the further communication device. Likewise, the network user charges relating to the transfer are incurred by the further communication device. Thus, the only thing required from the refuse container or (first) communication interface thereof is a transfer of data to the further communication device.

Preferably, such a communication device is selected from specific communication devices located in close proximity to the refuse container or in regular portions relative to the refuse container. Then, the data would be exchangeable in both directions by the first communication interface and the second communication interface, wherein according to the invention the data transfer takes place via the further communication interface.

The data transferred by means of the first data transfer can in principle be of very different kinds.

The transferred data may be user data stored in the memory device. Such user data are data that arise through the use of the refuse container. These can be user data of a single user or can comprise the user data of multiple users who have used the refuse container since the last first data transfer. Typically, the user data is transferred unidirectionally from the first communication interface via the further communication interface to the second communication interface.

According to an embodiment, the user can be identified by means of a communication device which itself has no communication connection with the server. In such an offline use, corresponding user data are filed in the memory device of the refuse container by the control device. Such user data may include the following data: identification data, data on the type and weight of the disposed waste, disposal times, etc.

According to a further embodiment, the user is identified by means of a communication device which itself has a communication connection to the server. Here, advantageously, the user identification can be carried out by the communication device through the communication device communicating with the server. Preferably, therefore, the user data can be transferred to the server via this communication device. However, it is advantageous if, during such online use, a backup copy of the user data is filed in the memory device of the refuse container by the control device. These backup copies can then be transferred to the server during a next first data transfer and be used to verify the originally transferred data. Such user data may also include the following data: identification data, data on the type and weight of the disposed waste, disposal times, etc.

The data transferred to the server by means of the first data transfer may advantageously also comprise sensor data originating from sensors present in the refuse container or located in the vicinity of the refuse container. Such data would preferably be transferred from the first communication interface via the further communication interface to the second communication interface.

In addition, it would be conceivable to transmit time data, system information, user behaviour, (unsuccessful) use attempts, and (unsuccessful) login attempts by means of the first data transfer. Such data would preferably be transferred from the first communication interface via the further communication interface to the second communication interface.

The data transferred by means of the first data transfer may also include software or firmware updates for corresponding components of the refuse container the updates being provided by the server. Such data would preferably be transferred from the second communication interface via the further communication interface to the first communication interface. For this purpose, it would be conceivable that individual packets are transferred to the memory device of the refuse container via different communication devices.

Preferably, the data transferred by means of the first data transfer may further include access lists, so-called whitelists or blacklists. Such access lists list the permissions of the users. This is particularly relevant for offline usage as mentioned. If, for example, payment of corresponding fees has not yet been made by a user, the user's authorisation may be revoked.

It would also be conceivable that the data transferred are part of a bidirectional data transfer. For example, the server could first submit a request to the refuse container for specific data, whereupon the container provides the requested data. It would also be conceivable that by means of the first data transfer, a remote diagnosis is carried out by the server in case of disruptions or malfunctions in the systems of the refuse container.

According to a particularly preferred embodiment, a first communication device comprises a third communication interface. Preferably, the unidirectional or bidirectional first data transfer between the first communication interface and the second communication interface takes place via the third communication interface. Advantageously, an emptying or service vehicle is equipped with the first communication device. It may be advantageous if the first communication device is a part of a processor, a so-called on-board computer (OBC) of the emptying or service vehicle. Since such emptying or service vehicles inevitably come within the immediate vicinity of the refuse container at regular intervals, a first data transfer via a communication device located in such a vehicle is particularly advantageous. Moreover, such a vehicle can easily provide the first communication device with a sufficient supply of energy. Preferably, the data transfer between the first and the third communication interface takes place via a first communication channel.

According to a further preferred embodiment, a second communication device comprises a fourth communication interface. Preferably, the unidirectional or bidirectional first data transfer between the first communication interface and the second communication interface takes place via the fourth communication interface. Advantageously, the second communication device is assigned to a user. Preferably, the second communication device is a portable data-processing device, preferably having a display device, such as a mobile phone, a smartphone, a tablet or a laptop. Such an embodiment has the advantage that a user of the refuse container can already use such a second communication device, such as a smartphone, online for the identification process. In particular, a smartphone is preferred as a communication device because it is widely used and has a variety of communication interfaces that could be used to establish a data connection to the refuse container on the one hand and/or the server on the other. In addition, a smartphone has a display device by means of which information could be sent to the user. The transfer of data preferably takes place between the first and the fourth communication interface via a second communication channel.

According to a further preferred embodiment, the unidirectional or bidirectional first data transfer between the first communication interface and the second communication interface can take place both via the first communication device, i.e. the third communication interface, and via the second communication device, i.e. the fourth communication interface.

However, the present invention is not limited to a specific type of communication device. A corresponding communication device only has to have a further communication interface which is capable of communicating with the first communication interface of the refuse container and the second communication interface of the server and of forwarding the data accordingly.

A communication channel should be understood as a transfer path. Such a transfer path connects a transmitter and a receiver. This transmitter or receiver is advantageously part of the respective communication interface or a corresponding further device. Accordingly, it is advantageous if the communication device and the refuse container are equipped with a corresponding transmitter or receiver of the respective technology. It is preferable for complementary transmitter-receiver pairs to be in place in the refuse container and the communication device and in the communication device and the server. A complementary transmitter-receiver pair in the refuse container and server is not required and preferably does not exist.

According to a further preferred embodiment, a second data transfer can be initiated between the first communication interface and the fourth communication interface in order to identify a user before the refuse container is used.

Advantageously, the second data transfer takes place between the first and the fourth communication interface via the second communication channel. The second data transfer is preferably bidirectional and may include identification data of the user and/or identification data of the refuse container intended for use. Preferably, after the second data transfer, a third data transfer takes place between the fourth communication interface of the second communication device and the second communication interface of the server. This third data transfer advantageously comprises the identification data of the user and/or the identification data of the refuse container intended for use. The third data transfer preferably takes place between the fourth communication interface and the second communication interface via an eighth communication channel.

Preferably, the server further comprises an authentication manager and a database. The authentication manager preferably assigns the authorisation data of the user stored in the database to the received identification data. On the basis of this assignment, access to the refuse container intended for use can be released or denied for this user. The corresponding authorisation data are preferably transferred from the second communication interface via the fourth communication interface to the first communication interface of the refuse container. The control device of the refuse container can then advantageously permit access to the refuse container on the basis of the authorisation data. Such an identification process is preferably referred to as online usage.

According to a further preferred embodiment, the refuse container comprises a receiving device which constitutes an internal device. Preferably, further data transfer in the form of a fourth data transfer via a third communication channel can take place between the receiving device and the first communication interface. A receiving device is to be understood as a device which is suitable for receiving identification data of a user. The fourth data transfer may also be a unidirectional or a bidirectional data transfer.

Preferably, to identify a user prior to the use of the refuse container, a fifth data transfer of identification data can be initiated between the receiving device and an identification device by means of a fourth communication channel. No data connection to the server is established for the identification of the user. Such a use is advantageously referred to as offline use.

Advantageously, such an identification device can be a transmitter, which transmits the identification data of the user by means of a wireless technology. Advantageously, a specific code or the like is transferred to the receiving device by means of the fifth data exchange. The identification device may be a transmitter provided specifically for using the refuse container, the transmitter being made available to the users by the operator.

However, it would also be conceivable that the identification device is a passive element, for example an (RFID) chip card, a magnetic card or the like. The identification data are contained or stored on such a passive element. The receiving device would be an active element in this case, which reads the identification data from the identification device. Such an identification device can also be provided to the users by the operator specifically for using the refuse container.

However, it would also be conceivable that the identification device is a second communication device, for example a smartphone. Some users prefer offline use, but still want to identify with a second communication device because such a device, for example a smartphone, is usually always at hand. Typically, the second communication device, such as a smartphone or similar device, has functions that are capable of transmitting corresponding identification data to the receiving device.

It would also be conceivable that such a receiving device is suitable for receiving other user identification data. For example, the receiving device can be an input device for a code, for example a numeric keypad. The receiving device may also be a reader for biometric data such as fingerprints or iris recognition, or a facial recognition device.

The data received by the receiving device are transferred via the fourth data transfer by means of the third communication channel to the first communication interface and from there to the control device. The third communication channel preferably uses a wireless technology. Accordingly, the receiving device can be placed at any point outside of the refuse container in the immediate vicinity thereof. Furthermore, costly cabling can be eliminated.

The fourth data transfer can be unidirectional as well as bidirectional. Bidirectional data transfer allows the transfer of software or firmware updates to the receiving device, for example.

The user data arising from offline use are stored by the control device in the memory device of the refuse container. This user data can advantageously be transferred to the server by means of the next first data transfer. The server can then use the user data to create invoices, statistics or the like.

Advantageously, at least one access list, a so-called whitelist or blacklist, is stored in the memory device for offline use. Such an access list comprises user authorisation data. The identification data received by the receiving device are preferably assigned to the authorisation data by the control device. Based on the authorisation data, access to the refuse container can be granted or denied. The access lists can advantageously be updated by the first data transfer. For example, in the case of a user who has exceeded a certain limit of disposed waste, the authorisation can be withdrawn until a corresponding additional payment has been made.

According to a preferred embodiment, data transfer via communication channels one to six is based on a wireless technology. Preferably, this wireless technology has a comparatively short range. The wireless technology preferably has a range less than 300 m, preferably less than 100 m, preferably less than 50 m, preferably less than 30 m, preferably less than 10 m, preferably less than 5 m, preferably less than 3 m, preferably less than 1 m, particularly preferably less than 50 cm. Advantageously, the wireless technology is selected from a group that comprises NFC (near-field communication) technology, RFID (radio-frequency identification) technology, WLAN (wireless local area network) technology, Bluetooth® technology and optical transmission technology.

Both NFC technology and RFID technology use high-frequency alternating magnetic fields for data transfer. RFID technology is usually a "connectionless" transmission. Here, a passive transponder is used, which is energised by the alternating field of a reading device. NFC technology also provides "connection-dependent" transmission. In the case of connection-dependent transmission, or also peer-to-peer transmission, a transmission is established between two equivalent transmitters.

Meanwhile, a large number of commercially-available smartphones equipped with an NFC device have become available. NFC technology can achieve a data transfer rate of 106 to 424 kbit/s. The data transfer is based on an amplitude modulation of a high-frequency magnetic field at a standardised frequency of 13.56 MHz. Only two users can participate in a data transfer, an initiator which acts as a sender of information, and a receiver which receives this information.

NFC technology also provides a "connectionless" transmission analogous to RFID technology. Such transmission is often referred to as passive transmission. Here, only the initiator generates the high-frequency magnetic field. The receiver can transfer data by means of a load modulation. In this case, energy absorption by a specially-tuned resonant circuit of the receiver from the magnetic field takes place instead, and the initiator then reacts.

In the case of "connection-dependent" or active transmission, both the initiator and the receiver generate a high-frequency magnetic field. First, a "handshake" is performed in which authentication takes place and various settings, such as the optimal transmission speed, are selected. Data exchange is then carried out. This transmission, referred to as "active-active" or also as "peer-to-peer", represents a preferred embodiment. Due to the mutual authentication, this active transmission is much safer compared to the "passive" transmission (in which at least one communication partner does not actively transmit the high-frequency magnetic field).

According to a further preferred embodiment, the data transfer takes place between the third and the second communication interface via a seventh communication channel. Preferably, the data transfer between the fourth and the second communication interface takes place via an eighth communication channel. Advantageously, the seventh and the eighth communication channel are based at least in portions on a wireless technology with a comparatively long range, preferably with a maximum range of over 30 m, preferably over 100 m, preferably over 500 m, preferably over 1 km, more preferably several km. Preferably, the seventh and eighth communication channels are based on a transmission technology selected from a group comprising a WLAN connection, mobile connection, 2G (GSM) connection, 3G (UMTS) connection, GPRS connection, 4G (LTE, WiMax) connection, 5G connection. Of course, other connections, such as radio connections, for example in the ISM band, come into consideration.

Communication channels one to six thus belong to a first group which preferably uses a wireless technology having a relatively short range. Communication channels seven and eight thus belong to a second group which preferably uses, at least in portions, a wireless technology having a comparatively long range. The different configuration of the groups of communication channels makes it possible for the respective communication channels to have different ranges and/or transmission powers. As a result, asymmetric communication can be formed in which the ranges and/or transmission power of the communication channels of the first group are preferably significantly lower than those of the second group.

This has the consequence that for the communication between the first and the further communication interface via the first or second communication channel, the energy requirement is significantly reduced compared to a direct communication between the first and the second communication interface. The communication between the first and the second communication interface is still ensured when the communication device is involved, wherein the increased energy requirement for the communication to and from the second communication interface via the seventh or eighth communication channel is provided by the communication device and/or other network participants (e.g. LAN or WLAN routers, Internet providers, a network infrastructure of a mobile service provider).

According to a further preferred embodiment, the further communication device, for example the first or second communication device, has a data-processing device which is set up to modulate data for transfer on different communication channels and/or for coding and/or for decoding the data received from respective communication interfaces prior to the forwarding of the data to the other respective communication interface. The data transferred by the first data transfer are basically forwarded unchanged by the further communication device. However, modulation of the data with respect to the different transmission technology used on the subsequent communication channel may be necessary.

According to a further preferred embodiment, communication interfaces one to four have a control device which carries out a test for error detection and monitoring during the data transfer. Such a test may be a parity check or the like, for example.

Advantageously, the first data transfer can be initiated within certain time intervals. However, it would also be conceivable to initiate a first data transfer based on another triggering event. Such a triggering event can also be generated by sensor data, such as exceeding a certain fill level. Likewise, a malfunction of a component of the refuse container may be such a triggering event.

Finally, the need to perform firmware or software updates may be such a triggering event. The first data transfer can therefore take place using the next available communication device. The first data transfer can also be carried out in real time.

Likewise, data transfers two to seven can be initiated within certain time intervals. These data transfers can also be carried out in real time or on the basis of a specific triggering event mentioned above.

According to a preferred embodiment, the refuse container comprises a porting device having a locking device. The locking device is preferably an electrical closing mechanism. The porting device preferably has a limited receiving volume, so that only a limited amount of waste can be disposed in the container in a single opening. Optionally, one or more devices for determining the added and/or existing amount of waste may be present in the port and/or the receiving region of the refuse container. For example, these could be devices for weight and/or volume determination.

Advantageously, the refuse container comprises a power supply which supplies the electrical and electronic equipment and components with power. The power supply is advantageously a battery. Alternatively or cumulatively, a solar cell or the like could also be provided.

Another essential aspect of the invention is a method for operating a refuse container which has an electronic control unit and a first communication interface for sending and receiving data, the method comprising the following steps:
  registering a triggering event via the first communication interface by means of a data transfer,
  generating at least a part of control data by the control device or receiving at least a part of control data from the first communication interface,
  transferring the control data to an internal or external device by means of a data transfer,
wherein the data transfer for registering the triggering event is takes place via a communication channel which is based on a wireless technology.

The method can have all the features already described above with regard to the system, individually or in combination with one another and vice versa.

According to a preferred embodiment, the wireless technology has a range of less than 300 m, preferably less than 100 m, preferably less than 50 m, preferably less than 30 m, preferably less than 10 m, preferably less than 5 m, preferably less than 3 m, preferably less than 1 m, particularly preferably less than 50 cm. Advantageously, the wireless technology is selected from a group comprising NFC technology, RFID technology, WLAN technology, Bluetooth® technology and optical transmission technology.

According to a preferred embodiment of the method, the refuse container comprises at least one sensor device which constitutes an internal device. Preferably, the data transfer is a sixth data transfer, which can take place between the at least one sensor device and the first communication interface via a fifth communication channel. Preferably, the sixth data transfer may be unidirectional or bidirectional. A bidirectional data transfer allows the transfer of software or firmware updates to the at least one sensor device, for example.

The at least one sensor device could advantageously have a sensor for monitoring the temperature inside the refuse container. By such monitoring the start of a fire in the refuse container can be detected and reported quickly.

Furthermore, the sensor device could have a level sensor, which ensures timely emptying. The level sensor can perform sonographic or optical level detection.

According to a further preferred embodiment of the method, the data transfer is a seventh data transfer. Advantageously, control data can be transferred to the at least one internal device of the refuse container or to at least one external device by means of the seventh data transfer. Advantageously, the seventh data transfer takes place via a sixth communication channel and can be unidirectional or bidirectional. Preferably, the at least one internal device may be an actuator, a locking device, a display device, an output device or a fire extinguisher.

According to a further preferred embodiment of the method, the control data are generated on the basis of a triggering event. The control data are preferably generated at least in part by the control device and/or at least in part by a sensor device. Such a triggering event can be structured in various ways. For example, it may be based on specific sensor data. Accordingly, the detection of a specific circumstance such as temperature, heat, or fill level would cause a sensor to generate sensor data, which are then advantageously evaluated fully or in part by the controller. On the basis of the evaluation, corresponding control data can then be generated which are transferred to the specific device.

However, it would also be conceivable that the sensor device already has an evaluation device which evaluates the sensor data at least in part and generates the control data at least in part. Said control data are then transferred to the specific device via the first communication interface and optionally via the control device and the first communication device.

However, the evaluation of the control data can preferably also be carried out by a server queried by the refuse container, the server first having received the sensor data via the first communication interface. The control data are then transferred via the first communication interface by means of the seventh data transfer to the at least one internal or the at least one external device.

For example, a level sensor could measure a certain fill level which would no longer allow any further disposal. The sensor data corresponding to the fill level would then be evaluated by either the sensor device, the control device, the server or another evaluation device. The correspondingly generated control data are then transferred to the internal device, which is in the form of a locking device, so that it locks the refuse container, whereby further disposal is prevented. At the same time, a further internal or external device in the form of a display or output device could be activated, the device indicating that the refuse container is currently unusable.

Similarly, a fire could be detected in or near the refuse container by means of an odour or temperature sensor. The control data generated as a result would then be transferred to an internal or external fire extinguisher, which would be activated.

However, the triggering event may advantageously also be a data transfer, a mere recognition of a particular communication device, the expiration of a predetermined time interval or the like.

According to a further preferred embodiment of the method, the further communication device comprises a first communication device which comprises the further communication interface in the form of a third communication interface. Preferably, an emptying or service vehicle is equipped with the first communication device. Advantageously, a data transfer by means of a wireless technology between the first communication interface and the third communication interface constitutes a triggering event. The control device preferably generates control data which are transferred to the internal device, in the form of a locking device, on the basis of the triggering event, whereupon the locking device unlocks. Thus, the system can advantageously provide automatic unlocking of the refuse container during an emptying operation. Until now, instructions for such unlocking are given on the basis of a detection of a lifting procedure. In the present case, the emptying or service vehicle or the first communication device can be detected by a data transfer. Accordingly, it is advantageous if authorisation takes place after establishing a communication connection between the first communication interface and the second communication interface. In this case, the control device detects the presence of an emptying vehicle and forwards corresponding control data via the first communication interface to the corresponding locking device. Such a detection can take place for example by a "handshake" in an NFC connection or a "pairing" in a Bluetooth® connection.

After the emptying process, the departure of the emptying vehicle can be detected, whereupon the control device outputs corresponding control data via the first communication interface to the corresponding locking device for locking.

According to a further preferred embodiment, the method comprises a data transfer between the refuse container and a server which is at a distance from the refuse container and has a second communication interface, the method comprising the following steps:
- establishing a data connection by means of a communication channel between the first communication interface and a further communication interface of a further communication device which is not part of the refuse container;
- authorising the data connection;
- initiating an indirect first data transfer between the first communication interface and the second communication interface and/or between the second communication interface and the first communication interface via at least one further communication interface.

This method allows communication between the refuse container and the server without the refuse container having to provide a communication interface, which is energy-intensive and cost-intensive, to allow direct communication with the remote server. Rather, a data connection in place between the one communication device—which comprises a further communication interface—and the server, can be (concurrently) used for indirect communication between the refuse container and the server. Establishing a data connection involves setting up a data connection. In the process, the initiator can be the first or the further communication interface. Furthermore, it may be advantageous if the transferred data are checked for their correctness.

The refuse container preferably has a memory device on which usage data is stored after the refuse container has been used. Preferably, the stored usage data is transferred by means of the first data transfer.

According to a particularly preferred embodiment of the method, a first communication device comprises a third communication interface. Preferably, the unidirectional or bidirectional first data transfer takes place between the first communication interface and the second communication interface via the third communication interface. Advantageously, an emptying or service vehicle is equipped with the first communication device. It may be advantageous if the first communication device is a part of a processor, a so-called on-board computer (OBC) of the emptying or service vehicle. Since such emptying or service vehicles inevitably come at regular intervals in the immediate vicinity of the refuse container, a first data transfer through a communication device located in such a vehicle is particularly advantageous. Moreover, such a vehicle can easily provide the first communication device with a sufficient supply of energy. Preferably, the data transfer between the first and the third communication interface takes place via a first communication channel.

According to a further preferred embodiment of the method, a second communication device comprises a fourth communication interface. Preferably, the unidirectional or bidirectional first data transfer between the first communication interface and the second communication interface takes place via the fourth communication interface. Advantageously, the second communication device is assigned to a user. Preferably, the second communication device is a portable data-processing device, preferably having a display device, such as a mobile phone, a smartphone, a tablet or a laptop. Such an embodiment has the advantage that a user of the refuse container can already use such a second communication device, for example a smartphone, online for the identification process. In particular, a smartphone is preferred as the communication device, since it is widely used and has a variety of communication interfaces that can be used to form a data connection to the refuse container on the one hand and/or to the server on the other. In addition, a smartphone has a display device by means of which information could be sent to the user. The transfer of data preferably takes place between the first and the fourth communication interface via a second communication channel.

According to a further preferred embodiment of the method, the unidirectional or bidirectional first data transfer between the first communication interface and the second communication interface can take place both via the first communication device or the third communication interface, as well as via the second communication device or the fourth communication interface.

According to a further preferred embodiment of the method, the data transfer between the third and the second communication interface takes place via a seventh communication channel, wherein the data transfer between the fourth and the second communication interface takes place via an eighth communication channel, wherein the seventh and the eighth communication channel are based at least in portions on a wireless technology having a maximum range of over 30 m, preferably over 100 m, preferably over 500 m, preferably over 1 km, more preferably several km, and on a transmission technology selected from a group comprising a WLAN connection, mobile connection, 2G (GSM) connection, 3G (UMTS) connection, GPRS connection, 4G (LTE, WiMax) connection and 5G connection.

Authorising a data connection may include recognising the further communication device by the first communication interface or by the control device of the refuse container. Such an operation includes associating transferred identification data with stored data. Such an authorisation can be used to detect whether the further communication device is associated with an emptying or service vehicle, for example. In the case of a currently present emptying vehicle, for example, preferably a locking device can be opened by the control device, whereby emptying of the refuse container can be carried out.

However, such authorisation may also be only systemic authorisation, for example a "handshake" in an NFC connection in which various settings, such as the optimal transfer speed, are selected. A "pairing" in a Bluetooth connection can also be such an authorisation.

According to a preferred embodiment, the method may include controlling access to a refuse container for a user, comprising the following further steps:
  a) before use of the refuse container, initiating a transfer of identification data from the first communication interface to a second communication device which is user-assignable and which comprises a fourth communication interface;
  b) transferring the identification data for the refuse container and the user from the second communication device which comprises the fourth communication interface to a server which comprises a second communication interface;
  c) receiving the identification data by the second communication interface and supplying the identification data to an authentication manager of the server;
  d) assigning user data from a database of the server to the identification data by the authentication manager;
  e) generating authorisation data for granting or denying access to this refuse container for this user;
  f) transferring the authorisation data from the second communication interface to the fourth communication interface and/or the second communication device and optionally converting the signal in the second communication device;
  g) transferring the authorisation data from the fourth communication interface and/or the second communication device to the first communication interface;
  h) granting or denying access to this refuse container to the user depending on the authorisation data received at the first communication interface.

In a further preferred variant of the method, different communication channels are used for steps a) and b). This allows the range of the communication channels and the energy required by the communication interface used to be adapted to the respective needs. Thus, a particularly energy-saving and cheap (indirect) communication between the first and the second communication interface is made possible.

In a further preferred variant of the method, it is provided that a low-power wireless technology having a range of less than 300 m is used for step a). This variant of the method is particularly preferred because step a) has been identified as being particularly critical with regard to the energy requirements of the refuse container and the costs of data transfer. Short-range wireless technologies typically allow low power consumption while still providing a relatively high data rate. In addition, such wireless technologies are usually free of charge, so that at least this portion of the communication between the first and the second communication interface incurs no costs. Particularly preferred for this is a transmission technology selected from a group comprising NFC technology, RFID technology and optical transmission technology. The resulting advantages have already been described above for the device.

Furthermore, a method variant is preferred in which, for step b), a wireless technology having a maximum range of more than 30 m is used at least in portions. The maximum range to be understood in this context is the range of communication between two communication interfaces under normal conditions without obstacles located between the communication interfaces. Such a range usually allows the (wireless) transmission of data from the communication device at least to the nearest transfer point via which the data (possibly by way of a local area network (LAN)) are fed into a wide area network (WAN) and then forwarded therethrough to the second communication interface. The transfer point or access point can be a WLAN router or a transmission mast of a mobile service provider, for example. A large range of the wireless technology used for step b), at least in portions, thus allows a large range of movement of the user while maintaining the wireless connection and consequently also a large variability in the selection of a location for the refuse container. For a further increase in the variability of the location and to largely maintain independence from existing infrastructure, the range of the wireless technology used for step b) at least in portions is preferably over 100 m, preferably over 500 m, preferably over 1 km, particularly preferably several km. The use of a transmission technology selected from a group comprising a WLAN connection, mobile radio connection, GSM connection, UMTS connection, GPRS connection, LTE connection and DECT has proven particularly suitable.

In terms of the method, it is preferred that the authorisation data transferred in step g) from the fourth communication interface and/or the second communication device to the first communication interface comprise a unique or rolling code. This is preferred to prevent unauthorised persons from reading the authentication data and using this data for unauthorised access to the refuse container. By using a unique or rolling code, the current access-granting data are rendered useless for the next access attempt and unauthorised access with this data at a later date is no longer possible.

BRIEF DESCRIPTION OF THE DRAWINGS

Other advantages, aims and properties of the present invention are explained with reference to the following description of the attached drawings. Similar components may have the same reference signs in the various embodiments.

In the drawings.

DETAILED DESCRIPTION

Figure 1:
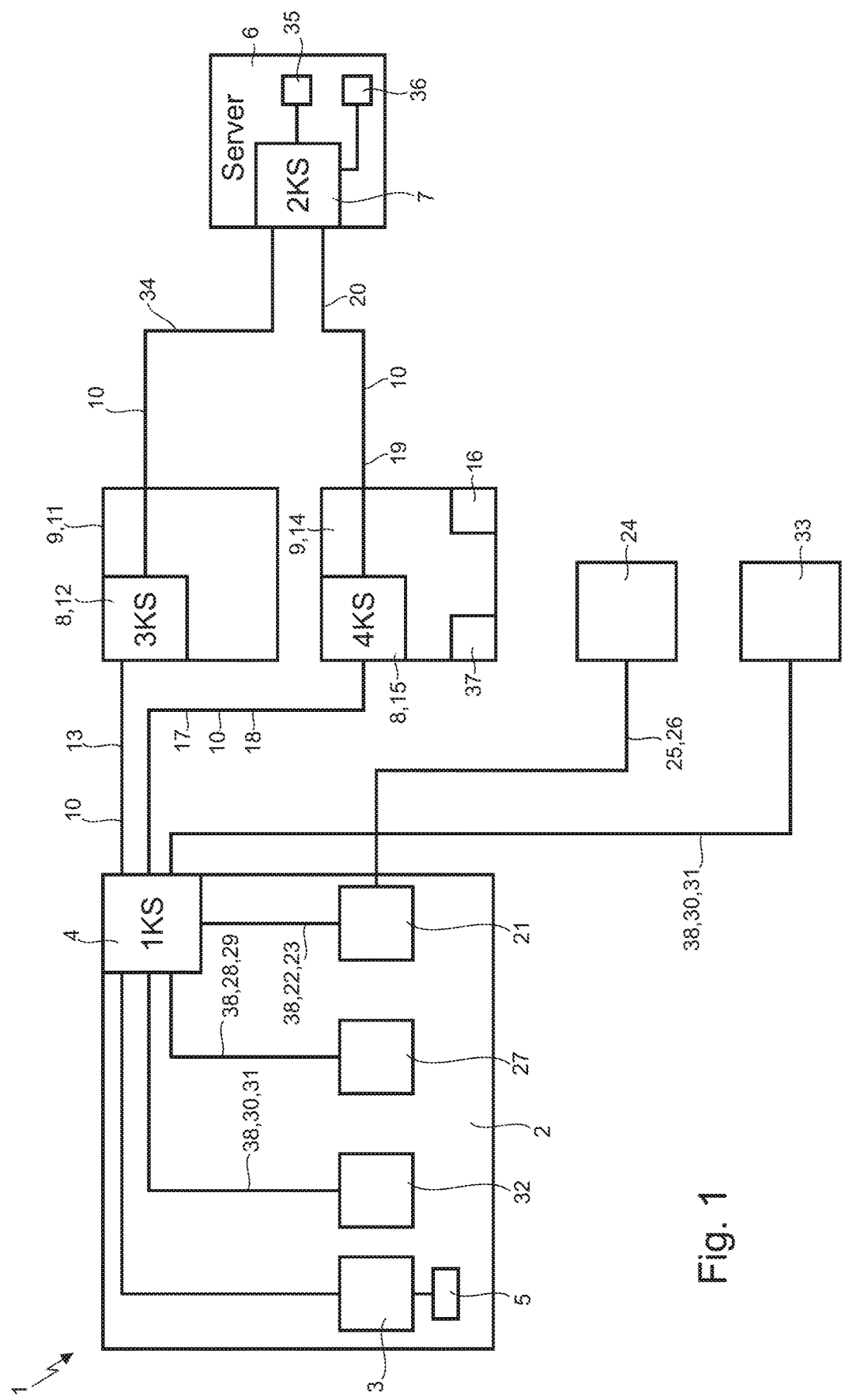
FIG. 1 is a schematic diagram of the system for delivering messages to a user of a refuse container according to one embodiment.
Figure 2:
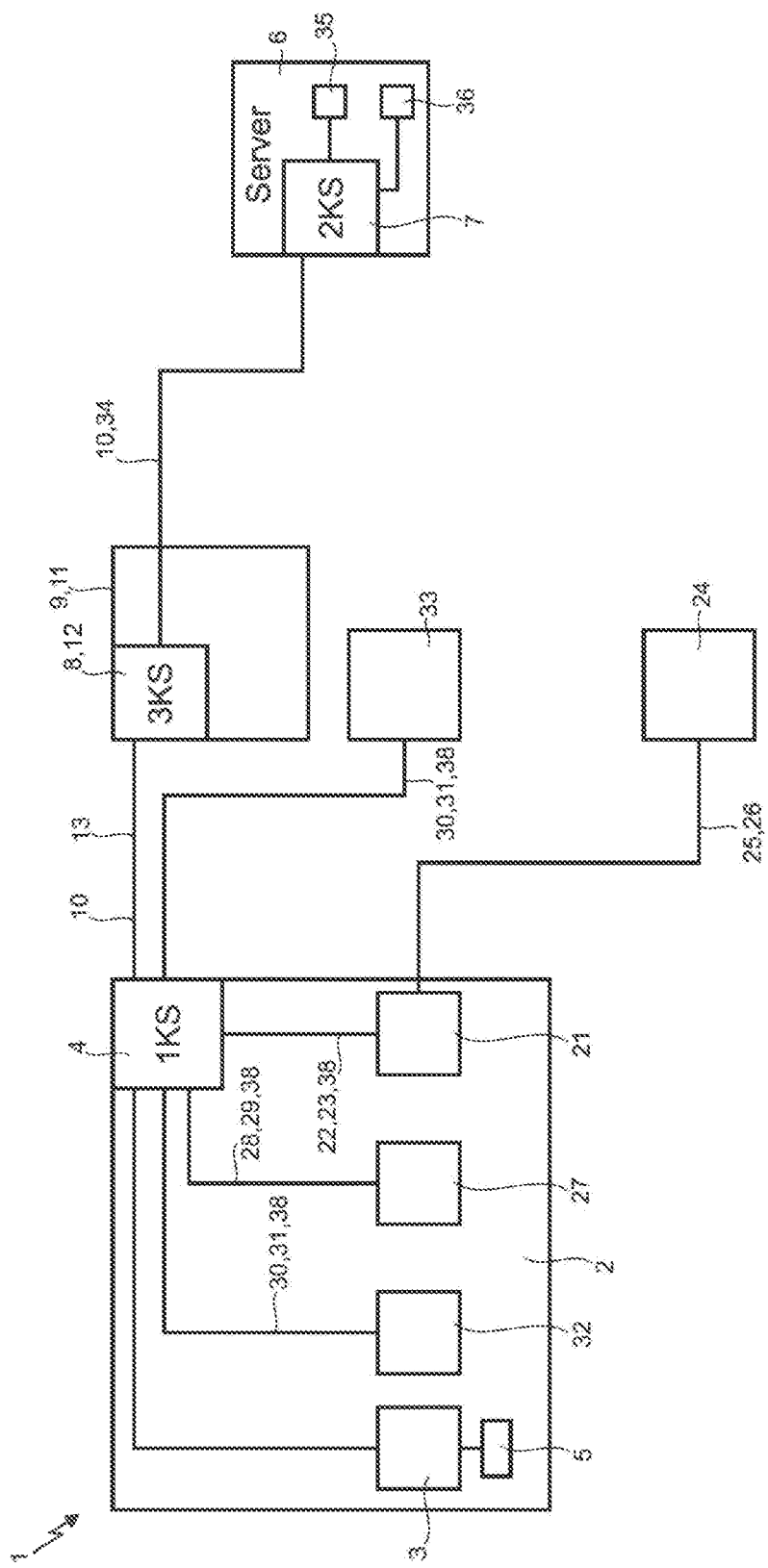
FIG. 2 is a schematic diagram of the system for delivering messages to a user of a refuse container according to another embodiment.
Figure 3:
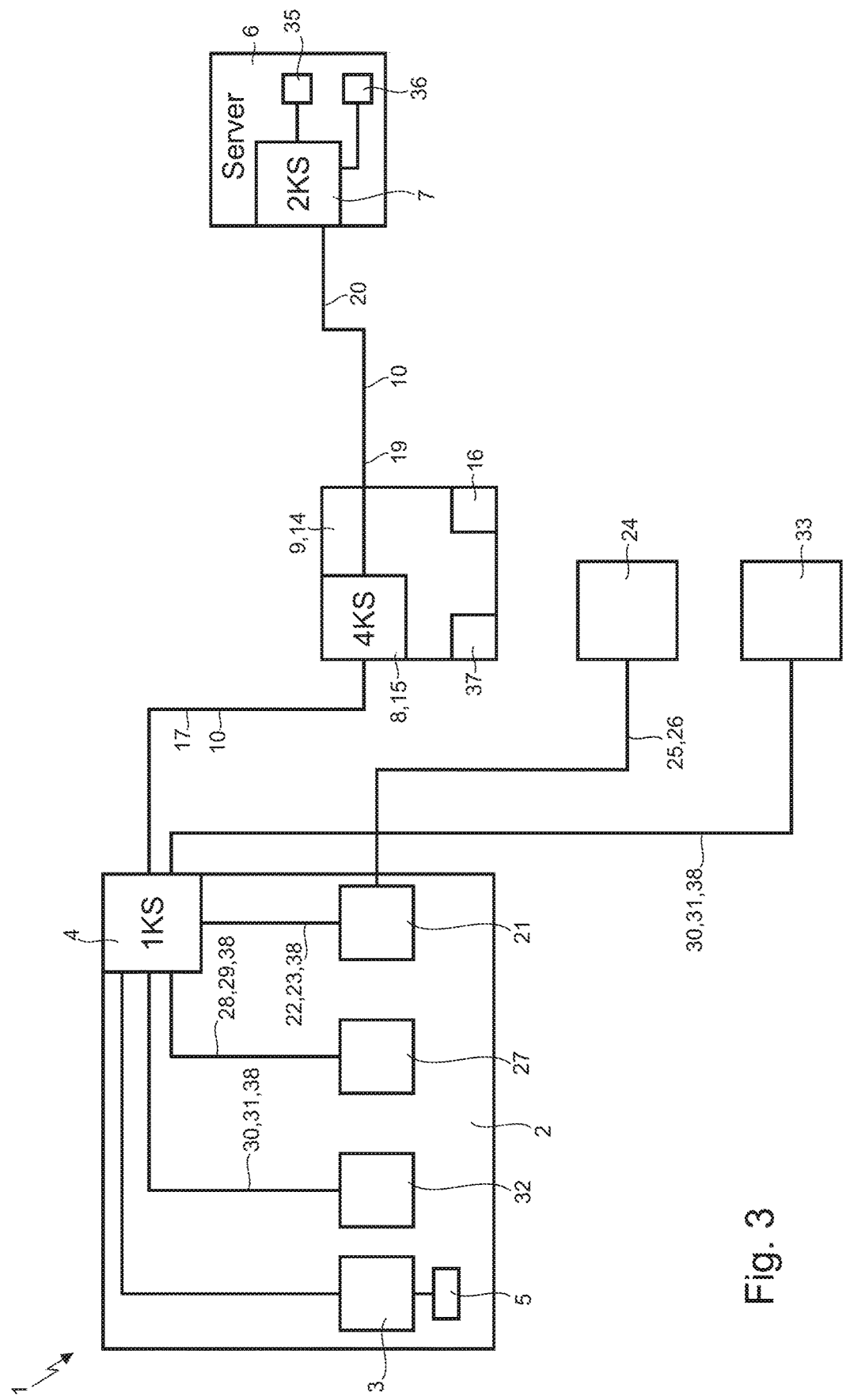
FIG. 3 is a schematic diagram of the system for delivering messages to a user of a refuse container according to another embodiment.

FIGS. 1 to 3 show a system (1) for operating a refuse container (2), comprising a refuse container (2) which has an electronic control device (3) and a first communication interface (4) for sending and receiving data, wherein a first data transfer (10) to at least one further communication interface (8, 12, 15) can be initiated via the first communication interface (4), the further communication interface being provided in at least one further communication device (9, 11, 14) which is not associated with the refuse container (2), wherein a further data transfer (38) between at least one internal device (22, 32) can be initiated via the first communication interface (4), wherein the first (10) and the further data set (38) are based on a wireless technology.

Furthermore, a method is shown in FIGS. 1 to 3 for operating a refuse container (2) comprising an electronic control unit (3) and a first communication interface (4) for sending and receiving data, the method comprising the following steps:
registering a trigger event via the first communication interface (4) by means of a data transfer,
generating at least a part of control data by the control device (3) or receiving at least a part of control data by the first communication interface (4),
transferring the control data to an internal or external device by means of a data transfer,
wherein the data transfer for registering the triggering event is takes place via a communication channel which is based on a wireless technology.

The refuse container (2) may comprise at least one sensor device (27), wherein the further data transfer is a sixth data transfer (28) which can take place between the at least one sensor device (27) and the first communication interface (4) via a fifth communication channel (29). The sixth data transfer (28) can be unidirectional or bidirectional.

The further data transfer can also be a seventh data transfer (30), wherein by means of the seventh data transfer (30) control data can be transferred to the at least one internal device (32) of the refuse container (2) or to at least one external device (33). The seventh data transfer (30) takes place via a sixth communication channel (31) and can be unidirectional or bidirectional. The at least one internal device (32) or the at least one external device (33) may be an actuator, a locking device, a display device, an output device or a fire extinguisher.

The control data are generated on the basis of a triggering event, wherein the control data are generated at least in part by the control device (3) and/or at least in part by a sensor device (27).

The further communication device (9, 11, 14) may be a first communication device (9, 11), which comprises the further communication interface in the form of a third communication interface (8, 12). In this case, an emptying or service vehicle can be equipped with the first communication device (9, 11). A data transfer between the first communication interface (4) and the third communication interface (8, 12) can thus represent a triggering event, whereupon the control device (3) generates control data based on the triggering event which are transferred to the internal device (32) in the form of a locking device, whereupon the locking device unlocks. Thus, a simple effective emptying of the refuse container can be ensured.

The system (1) may have a server (6) which is at a distance from the refuse container and comprises a second communication interface (7). The first communication interface (4) has no device for direct data transfer to the second communication interface (7) and an indirect first data transfer between the first communication interface (4) and the second communication interface (7) and/or between the second communication interface (7) and the first communication interface (4) can be initiated via the at least one further communication interface (8, 12, 15). After the refuse container (2) is used, the control device (3) can store usage data in a memory device (5) associated with the refuse container. Said stored usage data can then in turn be transferred to the server (6) via the first data transfer (10).

Accordingly, the method for operating a refuse container may preferably further comprise a method for data transfer between a refuse container (2) which comprises an electronic control device (3), a first communication interface (4) for sending and receiving data and a memory device (5), and a server (6) which is at a distance from the refuse container (2) and has a second communication interface (7), the method comprising the following steps:
establishing a data connection by means of a communication channel (13, 17) between the first communication interface (4) and a further communication interface (8, 12, 15) of a further communication device (9, 11, 14) which is not part of the refuse container (2);
authorising the data connection;
initiating an indirect first data transfer (10) between the first communication interface (4) and the second communication interface (7) and/or between the second communication interface (7) and the first communication interface (4) via at least one further communication interface (8, 12, 15).

In the embodiment according to FIG. 2, the system (1) comprises a first communication device (9, 11) and a third communication interface (8, 12), wherein the unidirectional or bidirectional first data transfer (10) between the first communication interface (4) and the second communication interface (7) can take place via the third communication interface (8, 12). In this case, the first communication device (9, 11) is provided in an emptying or service vehicle. The data transfer takes place here between the first (4) and the third communication interface (8, 12) via a first communication channel (13).

In the embodiment according to FIG. 3, the system (1) comprises a second communication device (9, 14) and a fourth communication interface (8, 15), wherein the unidirectional or bidirectional first data transfer between the first communication interface (4) and the second communication interface (7) can take place via the fourth communication interface (8, 15). The second communication device (9, 14) is assigned to a user, wherein the second communication device (9, 14) is a portable data processing device, preferably having a display device (16), for example a mobile phone, a smartphone, a tablet or a laptop. The transfer of data between the first (4) and the fourth communication interface (8, 15) takes place via a second communication channel (17).

In the embodiment according to FIG. 1, the first data transfer (10) can take place both via the third communication interface (8, 12) of the first communication device (9, 11) and via a fourth communication interface (8, 15) of a second communication device (9, 14).

To identify a user before the refuse container (2) is used, a second data transfer (18) can be initiated between the first communication interface (4) and the fourth communication interface (8, 15). Furthermore, a subsequent third data transfer (19) can be initiated between the fourth communication interface (8, 15) and the second communication interface (7) of the server (6). The second data transfer (18) of identification data takes place between the first (4) and the fourth communication interface (8, 15) via the second communication channel (17). The third data transfer (19) takes place between the fourth communication interface (8, 15) and the second communication interface (7) via an eighth communication channel (20).

According to an embodiment, said method may include controlling access to the refuse container (2) for a user, comprising the following further steps:
a) before the refuse container (2) is used, initiating a transfer of identification data from the first communication interface (4) to a second communication device (9, 14) which can be assigned to a user and which comprises a fourth communication interface (8, 15);
b) transferring the identification data for the refuse container (2) and the user from the second communication device (9, 14) comprising the fourth communication interface (8, 15) to a server (6) comprising a second communication interface (7);
c) receiving the identification data through the second communication interface (7) and supplying the identification data to an authentication manager (35) of the server (6);
d) assigning user data from a database (36) of the server (6) to the identification data through the authentication manager (35);
e) generating authorisation data to grant or deny access to this refuse container (2) for this user;
f) transferring the authorisation data from the second communication interface (7) to the fourth communication interface (8, 15) and/or to the second communication device (9, 14) and optionally converting the signal in the second communication device (9, 14);
g) transferring the authorisation data from the fourth communication interface (8, 15) and/or the second communication device (9, 14) to the first communication interface (4);
h) granting or denying access to this refuse container (2) to the user depending on the authorisation data received at the first communication interface (4).

The refuse container (2) may optionally comprise a receiving device (21). A fourth data transfer (22) can take place via a third communication channel (23) between the receiving device (21) and the first communication interface (4), wherein the fourth data transfer (22) can be unidirectional or bidirectional. Before the refuse container (2) is used, to identify a user a fifth data transfer (26) of identification data can be initiated between the receiving device (21) and an identification device (24) by means of a fourth communication channel (25). Such an identification process is a so-called offline use of the refuse container (2).

The refuse container (2) may comprise at least one sensor device (27). A sixth data transfer (28) can take place via a fifth communication channel (29) between the at least one sensor device (27) and the first communication interface (4), wherein the sixth data transfer (28) may be unidirectional or bidirectional.

According to an embodiment, control data can be transferred from the first communication interface (4) to at least one internal device (32) of the refuse container (2) or to at least one external device (33) by means of a seventh data transfer (30). The seventh data transfer (30) takes place via a sixth communication channel (31) and can be unidirectional or bidirectional. The control data are generated at least in part by the control device (3) or at least in part by a sensor device (27). The at least one internal device (32) or the at least one external device (33) may be an actuator, a locking device, a display device, an output device or a fire extinguisher.

According to a further embodiment, the data transfer via communication channels one to six (13, 17, 23, 25, 29) is based on a wireless technology, wherein the wireless technology has a range of less than 300 m, preferably less than 100 m, preferably less than 50 m, preferably less than 30 m, preferably less than 10 m, preferably less than 5 m, preferably less than 3 m, preferably less than 1 m, particularly preferably less than 50 cm, the wireless technology being selected from a group comprising NFC technology, RFID technology, WLAN technology, Bluetooth® technology and optical transmission technology.

According to a further embodiment, the data transfer between the third (8, 12) and the second communication interface (7) takes place via a seventh communication channel (34). The data transfer takes place between the fourth (9, 14) and the second communication interface (7) via an eighth communication channel (20). The seventh (34) and the eighth communication channel (20) are based at least in portions on a wireless technology having a maximum range of over 30 m, preferably over 100 m, preferably over 500 m, preferably over 1 km, more preferably several km and on a transmission technology which is selected from a group comprising a WLAN connection, radio connection, mobile connection, 2G connection, 3G connection, GPRS connection, 4G connection, 5G connection.

In accordance with a further embodiment, the further communication device (9, 11, 14) has a data-processing device which is used to modulate data for transfer on different communication channels (13, 17, 34, 20) and/or for coding and/or for decoding the data received from the respective communication interfaces (4, 7, 8, 12, 15) prior to said data being forwarded to the respective other communication interface (4, 7, 8, 12, 15).

In the following, an overview is presented which lists the various communication channels, the data transfers and the communication interfaces (KS)/devices involved. Furthermore, the respective preferred transmission technology/wireless technology is specified.

| Communication channel | Data transfer | Participating communication interfaces (KS)/devices | Range of wireless technology |
| --- | --- | --- | --- |
| First (13) | First (10) | First KS (4)/ third KS (8, 12) | Short |
| Second (17) | First (10), second (18) | First KS (4)/ fourth KS (8, 15) | Short |
| Third (23) | Fourth (22) further (38) | First KS (4)/ receiving device (21) | Short |
| Fourth (25) | Fifth (25) | Receiving device (21)/ Identification device (24) | Short |

-continued

| Communication channel | Data transfer | Participating communication interfaces (KS)/devices | Range of wireless technology |
|---|---|---|---|
| Fifth (29) | Sixth (28) further (38) | First KS (4)/ sensor device (27) | Short |
| Sixth (31) | Seventh (30) further (38) | First KS (4)/internal (32) or external device (33) | Short |
| Seventh (34) | First (10) | Third KS (8, 12)/ second KS (7) | Long |
| Eighth (20) | First (10) third (19) | Fourth KS (8, 15)/ second KS (7) | Long |

The present invention is able to preferably solve the problem of the automatic unlocking request made by the emptying vehicle when it is nearby. Furthermore, persons without a smartphone can be provided with a way to open the refuse container (2). Due to the advantageous use of a receiving device (21), communication can take place preferably via a radio link to the control device (3). For communication with the receiving device (21) conventional RFID media can be used, including RFID cards, key fobs and NFC units. This additional receiving device (21) can also be used to identify persons with smartphones to allow opening, but not to allow transfer of data to the host, if this is not desired. Advantageously, sensors (27) (e.g.: level sensors, odour sensors, noise sensors, temperature sensors, acceleration sensors, voice sensors) can be integrated into the transmission of information to the control device (3). Finally, the control device (3) can advantageously evaluate this information and forward the information or control the corresponding actuators (32) (e.g. for blocking access). This allows wired solutions to be avoided. Other sensors which are necessary to detect emptying can also be avoided. Already known systems have the disadvantage that there is additional complexity due to wiring and the installation conditions of the components are restricted. There is a high software requirement for emptying algorithms and the maintenance of the individual systems is time-consuming. A fully integrated digital refuse disposal system is advantageously provided.

All the features disclosed in the application documents are claimed as being essential to the invention, to the extent that they are novel over the prior art individually or in combination.

LIST OF REFERENCE NUMERALS 1 system
2 refuse container
3 electronic control device
4 first communication interface
5 memory device
6 server
7 second communication interface
8 further communication interface
9 further communication device
10 first data transfer
11 first communication device
12 third communication interface
13 first communication channel
14 second communication device
15 fourth communication interface
16 display device
17 second communication channel
18 second data transfer
19 third data transfer
20 sixth communication channel
21 receiving device
22 fourth data transfer
23 third communication channel
24 identification device
25 fourth communication channel
26 fifth data transfer
27 sensor device
28 sixth data transfer
29 fifth communication channel
30 seventh data transfer
31 sixth communication channel
32 internal device
33 external device
34 seventh communication channel
35 authentication manager
36 database
37 data processing device
38 further data transfer

The invention claimed is:

1. A system for operating a refuse container, the system comprising:
a refuse container that has an electronic control device and a first communication interface for sending and receiving data; and
a server disposed a first distance from the refuse container and that comprises a second communication interface,
wherein a first data transfer to at least one further communication interface is initiable by way of the first communication interface, the at least one further communication interface being provided in at least one further communication device that is not associated with the refuse container,
wherein a further data transfer from at least one internal device in the refuse container different from the first data transfer can be initiated via the first communication interface,
wherein the first data transfer and the further data transfer are based on a wireless technology,
wherein the first communication interface has no device for direct data transfer to the second communication interface,
wherein an indirect second data transfer is initiable between at least one of the first communication interface and the second communication interface or between the second communication interface and the first communication interface via the at least one further communication interface,
wherein the at least one further communication device is a first communication device that comprises the further communication interface in a form of a third communication interface,
wherein an emptying or service vehicle is equipped with the first communication device,
wherein the electronic control device generates control data based on a triggering event,
wherein the control data are transferred via the first communication interface from the electronic control device to the at least one internal device that includes a locking device, and
wherein the indirect second data transfer and a lapse in a predetermined amount of time represent the triggering event.

2. The system according to claim 1, wherein the refuse container comprises at least one sensor device, wherein the further data transfer can take place between the at least one sensor device and the first communication interface via a first communication channel, and wherein the further data transfer is unidirectional or bidirectional.

3. The system according to claim 2, wherein the wireless technology has a range of less than 50 centimeters (cm), and wherein the wireless technology is selected from a group comprising near-field communication (NFC) technology, radio frequency identification (RFID) technology, wireless local area network (WLAN) technology, device pairing technology, and optical transmission technology.

4. The system according to claim 1, wherein the control data can be transferred to at least one external device by the further data transfer, wherein the further data transfer takes place via a first communication channel and is unidirectional or bidirectional, wherein at least one of the at least one internal device or the at least one external device comprises an actuator, a locking device, a display device, an output device, or a fire extinguisher.

5. The system according to claim 4, wherein the control data are generatable at least in part by at least one of the electronic control device or a sensor device.

6. The system according to claim 1, wherein usage data can be stored by the electronic control device in a memory device associated with the refuse container after a use of the refuse container, and wherein the stored usage data is transferrable to the server.

7. The system according to claim 6, wherein a unidirectional or bidirectional first data transfer between the first communication interface and the second communication interface can take place via the third communication interface, wherein the unidirectional or bidirectional first data transfer between the first and the third communication interface takes place via a first communication channel.

8. The system according to claim 6, wherein a second communication device comprises a fourth communication interface, wherein a unidirectional or bidirectional first data transfer between the first communication interface and the second communication interface can take place via the fourth communication interface, wherein the second communication device is assigned to a user, wherein the second communication device is a portable data processing device that includes a display device, and wherein a transfer of data between the first and the fourth communication interface takes place via a first communication channel.

9. The system according to claim 8, wherein the display device is a mobile phone, a smartphone, a tablet, or a laptop.

10. The system according to claim 1, wherein to identify a user before a use of the refuse container, a third data transfer of identification data is initiable between the first communication interface and the third communication interface and a subsequent fourth data transfer is initiable between the third communication interface and the second communication interface of the server, wherein the third data transfer of the identification data between the first and the third communication interface takes place via a first communication channel, and wherein the fourth data transfer between the third communication interface and the second communication interface takes place via a second communication channel.

11. The system according to claim 1, wherein the refuse container comprises a receiving device, wherein a third data transfer can take place via a first communication channel between the receiving device and the first communication interface, wherein the third data transfer can be unidirectional or bidirectional, and wherein, to identify a user before a use of the refuse container, a fourth data transfer of identification data is initiable between the receiving device and an identification device by a second communication channel.

12. The system according to claim 1, wherein the indirect second data transfer between the first communication interface and the second communication interface takes place via a first communication channel, wherein the first communication channel is based at least in portions on a wireless technology having a maximum range of over 1 kilometer (km), and wherein the indirect second data transfer occurs on a transmission technology selected from a group comprising a WLAN connection, a radio connection, a mobile connection, a 2G connection, a 3G connection, a general packet radio service (GPRS) connection, a 4G connection, and a 5G connection.

13. A method for operating a refuse container comprising an electronic control unit, the method comprising the following steps:
registering a triggering event based on a lapse in a predetermined amount of time and based on an indirect first data transfer via a first communication interface that can send and receive data;
generating at least a part of control data by the electronic control unit;
transferring the control data via the first communication interface from the electronic control unit to an external device by a second data transfer;
establishing a data connection by a communication channel between the first communication interface and a further communication interface of a further communication device that is not part of the refuse container;
initiating, via the further communication interface, the indirect first data transfer between the first communication interface and a second communication interface of a server that is a first distance from the refuse container; and
initiating, via the first communication interface, a third data transfer from the electronic control unit to an internal device that includes a locking device,
wherein the indirect first data transfer for registering the triggering event takes place via a communication channel that is based on a wireless technology,
wherein the first communication interface has no device for direct data transfer to the second communication interface,
wherein the indirect first data transfer between the first communication interface and the second communication interface occurs through a third communication interface associated with a first communication device, and
wherein the first communication device is disposed in an emptying or service vehicle.

14. The method according to claim 13, wherein the wireless technology has a range of less than 50 centimeters (cm), and wherein the wireless technology is selected from a group comprising near-field communication (NFC) technology, radio frequency identification (RFID) technology, wireless local area network (WLAN) technology, device pairing technology, and optical transmission technology.

15. The method according to claim 13, wherein the method comprises a data transfer between the refuse container and the server, the method further comprising:
authorizing the data connection.

* * * * *